(12) United States Patent
Subba et al.

(10) Patent No.: US 11,947,125 B2
(45) Date of Patent: Apr. 2, 2024

(54) MOUNTING MECHANISMS FOR OPTICAL ASSEMBLIES

(71) Applicant: Meta Platforms Technologies, LLC, Menlo Park, CA (US)

(72) Inventors: Chandrashekar Subba, Redmond, WA (US); Shobhit Verma, Sammamish, WA (US); Jason Victor Tsai, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/056,238

(22) Filed: Nov. 16, 2022

(65) Prior Publication Data

US 2023/0185097 A1 Jun. 15, 2023

Related U.S. Application Data

(60) Provisional application No. 63/289,367, filed on Dec. 14, 2021.

(51) Int. Cl.
*G09G 5/00* (2006.01)
*G02B 7/02* (2021.01)
*G02B 27/01* (2006.01)

(52) U.S. Cl.
CPC ......... *G02B 27/0176* (2013.01); *G02B 7/022* (2013.01); *G02B 7/026* (2013.01); *G02B 2027/0178* (2013.01)

(58) Field of Classification Search
CPC .... G02B 27/0176; G02B 7/022; G02B 7/026; G02B 2027/0178

USPC ............................................. 345/8
See application file for complete search history.

(56) References Cited

U.S. PATENT DOCUMENTS

| 11,113,889 | B1 | 9/2021 | Castañeda et al. | |
|---|---|---|---|---|
| 11,163,166 | B1 | 11/2021 | Ebert | |
| 2011/0025974 | A1* | 2/2011 | Schepke | G02C 1/04 351/103 |
| 2014/0078461 | A1* | 3/2014 | Earley | G02C 5/14 351/116 |
| 2014/0112503 | A1* | 4/2014 | Hebenstreit | H04R 5/02 381/162 |
| 2014/0133936 | A1* | 5/2014 | Yumi | F16B 33/006 411/378 |

(Continued)

OTHER PUBLICATIONS

International Search Report and Written Opinion for International Application No. PCT/US2022/052787, dated Apr. 5, 2023, 7 pages.

*Primary Examiner* — Jonathan M Blancha
(74) *Attorney, Agent, or Firm* — Greenberg Traurig LLP (57) ABSTRACT

Optical assemblies may include a projector assembly, a waveguide, and a mounting mechanism. The projector assembly may be configured for generating an image, and the waveguide may be configured for transmitting the image to a location in front of a user's eye. The mounting mechanism may removably couple the waveguide to an underlying frame. The mounting mechanism may include a detachable coupling, at least one flexure secured to a peripheral edge of the waveguide, and at least one flexure support coupled to the at least one flexure. The flexure support may be removably secured to the detachable coupling by a removable retainer. Various other related systems, methods, and devices are also disclosed.

20 Claims, 8 Drawing Sheets

(56) References Cited

U.S. PATENT DOCUMENTS

| | | | |
|---|---|---|---|
| 2014/0185001 A1* | 7/2014 | Farnam | G02C 5/146 |
| | | | 351/178 |
| 2014/0300854 A1* | 10/2014 | Fox | G02C 1/08 |
| | | | 351/96 |
| 2017/0017096 A1* | 1/2017 | Munakata | G02C 9/04 |
| 2017/0184862 A1* | 6/2017 | Miyao | G02B 6/0001 |
| 2018/0188555 A1* | 7/2018 | Quere | G02C 7/086 |
| 2020/0166782 A1 | 5/2020 | Liao | |

* cited by examiner

FIG. 8

MOUNTING MECHANISMS FOR OPTICAL ASSEMBLIES

CROSS REFERENCE TO RELATED APPLICATION

This application claims the benefit of U.S. Provisional Application No. 63/289,367, filed 14 Dec. 2021, the entire disclosure of which is incorporated herein by this reference.

BRIEF DESCRIPTION OF THE DRAWINGS

The accompanying drawings illustrate a number of example embodiments and are a part of the specification. Together with the following description, these drawings demonstrate various principles of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within this disclosure.

DETAILED DESCRIPTION OF EXAMPLE EMBODIMENTS

Optical assemblies (e.g., assemblies including an optical projector and a waveguide) may be secured (e.g., adhere, welded) to an underlying support, such as an augmented-reality glasses frame. If any defects in the optical assembly are identified after the optical assembly is secured to the underlying support, the secure attachment may make it difficult or impossible to remove the optical assembly for correction or replacement. In such cases, the entire product including the frame may need to be scrapped.

This disclosure generally relates to optical assemblies and mounting systems for optical assemblies. In some embodiments, the optical assemblies of the present disclosure may include a waveguide that is detachably coupled to an underlying support, such as an augmented-reality glasses frame. A flexure assembly may hold the waveguide in place relative to the frame, and the flexure assembly may be secured to the frame with a detachable coupling. Options for the detachable coupling may include small screws and removable nuts, a flexible clip, a c-shaped clamp, etc. If there is a defect or another reason to remove or re-fit the waveguide, the waveguide can be removed by decoupling the flexure assemblies from the frame. This removal can be accomplished without damaging the frame and/or the waveguide, which may reduce waste and improve costs involved in manufacturing augmented-reality glasses or other head-mounted displays.

The following will describe, with reference to FIGS. 1 through 5, optical assemblies and components thereof. With reference to FIG. 6, a method of assembling optical assemblies will then be described. Then, systems that may employ optical assemblies of the present disclosure will be described in connection with FIGS. 7 and 8.

Figure 1:
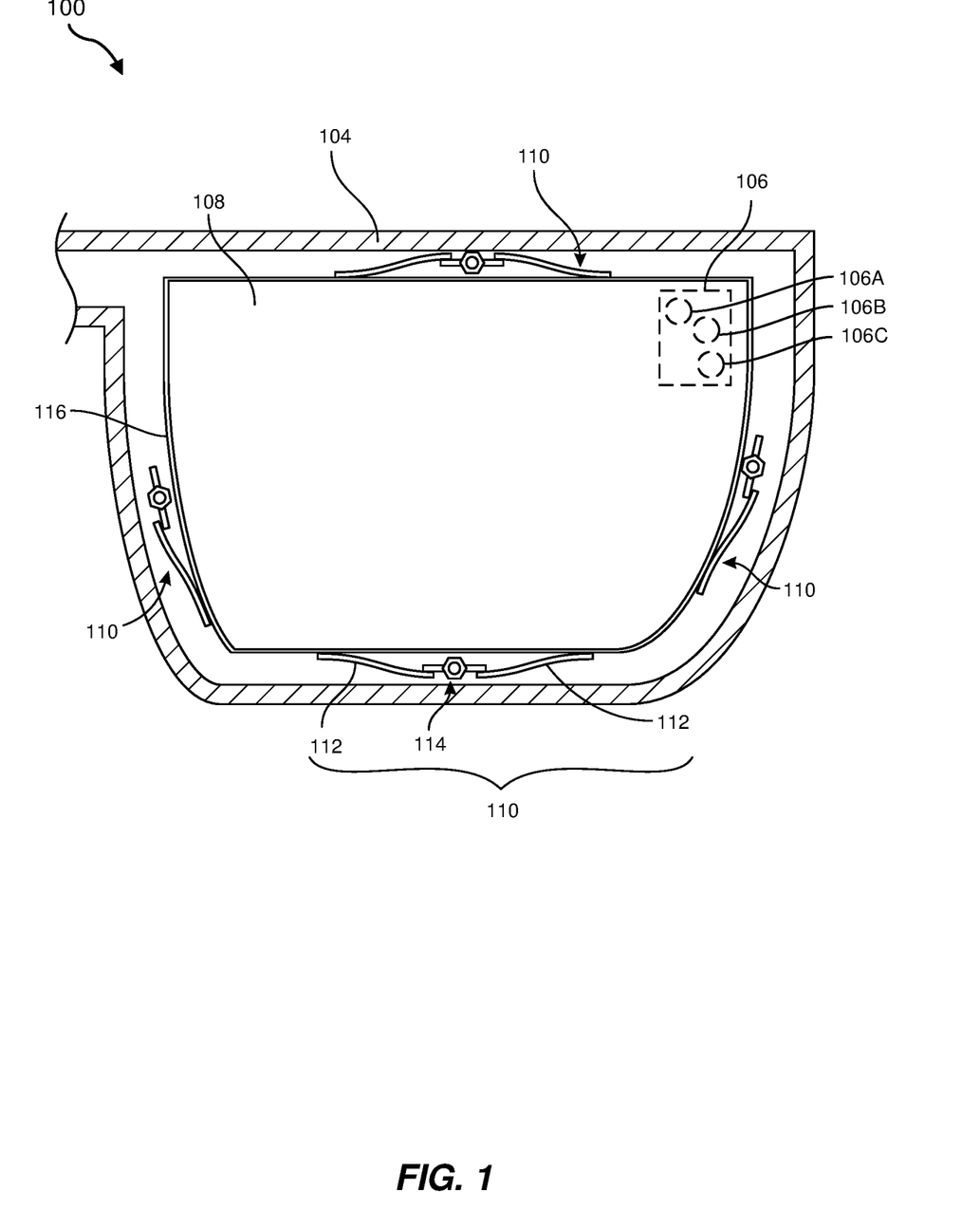
FIG. 1 is a plan view of an optical assembly, including a mounting mechanism therefor, according to at least one embodiment of the present disclosure.

FIG. 1 is a plan view of an optical assembly 100, including a mounting mechanism 102 therefor, according to at least one embodiment of the present disclosure. The optical assembly 100 may include a glasses frame 104 (e.g., an augmented-reality glasses frame), a projector assembly 106 for generating an image, a waveguide 108 for transmitting the image from the projector assembly 106 to a position in front of a user's eye, and one or more flexure assemblies 110 (e.g., one, two, three, four, or five flexure assemblies 110) for positioning and securing the waveguide 108 to the glasses frame 104.

The waveguide 108 may include one or more input gratings to enable the image from the projector assembly 106 to enter the waveguide 108 for transmission of the image to the position in front of the user's eye. The projector assembly 106 may include one or more subprojectors 106A, 106B, 106C optically aligned with the input grating(s) of the waveguide 108. By way of example and not limitation, each of the subprojectors 106A, 106B, 106C may be configured to emit a different wavelength of light, such as red, green, blue, infrared, white, etc.

Each flexure assembly 110 may include one or more flexures 112 (e.g., one or two flexures) that extend from a detachable coupling 114 to a peripheral edge of the waveguide 108 and/or to a peripheral edge of a waveguide holder 116. The detachable coupling 114 may be configured for securing the waveguide 108 to the glasses frame 104 in a detachable manner.

Each of the flexures 112 may include a flexible strip of material, such as a metal material, a plastic material, or a fiber-matrix composite material. The flexures 112 may allow for some movement of the waveguide 108 within the glasses frame 104, such as for proper alignment of the waveguide 108 with the projector assembly 106 to avoid optical errors. Additionally, in some embodiments, the flexures 112 may reduce the risk of the optical assembly 100 breaking from a drop event by allowing for shock absorption and relative movement between the waveguide 108 and the glasses frame 104. In additional examples, the material of the flexures 112 may be selected to accommodate a potential mismatch in coefficients of thermal expansion (CTEs) between the waveguide 108 and the underlying glasses frame 104. Thus, the flexures 112 can help alleviate optical aberrations that may otherwise occur upon thermal changes in the optical assembly 100.

As illustrated in FIG. 1, the waveguide 108 may be held in place on the frame 104 with multiple flexure assemblies 110. For example, the optical assembly 100 may include three flexure assemblies 110, four flexure assemblies 110, five flexure assemblies 110, or any other number of flexure assemblies 110 suitable for detachably mounting the waveguide 108 to the frame 104.

Figure 2:
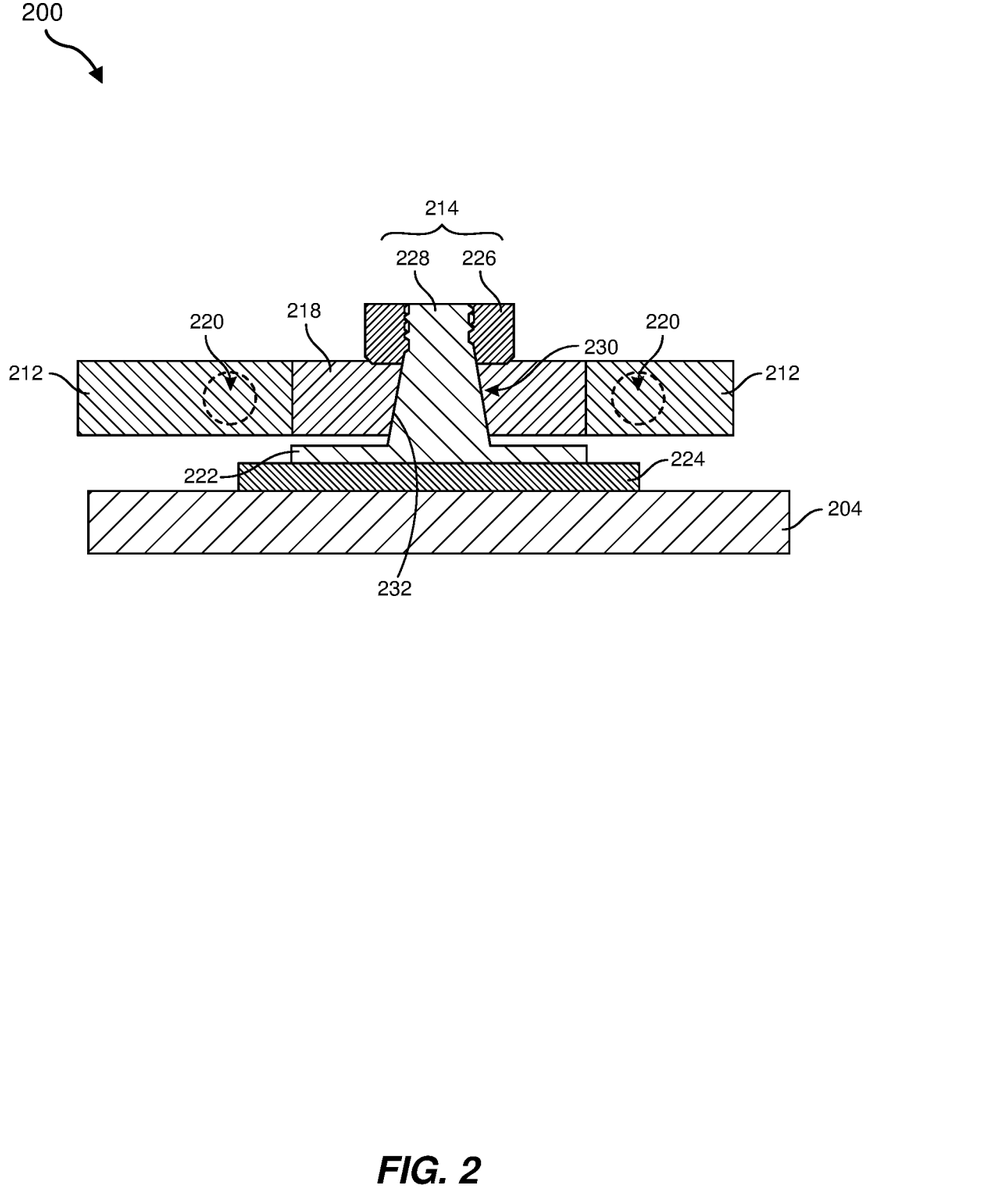
FIG. 2 is a side cross-sectional view of a mounting mechanism for an optical assembly, according to at least one embodiment of the present disclosure.
Figure 3:
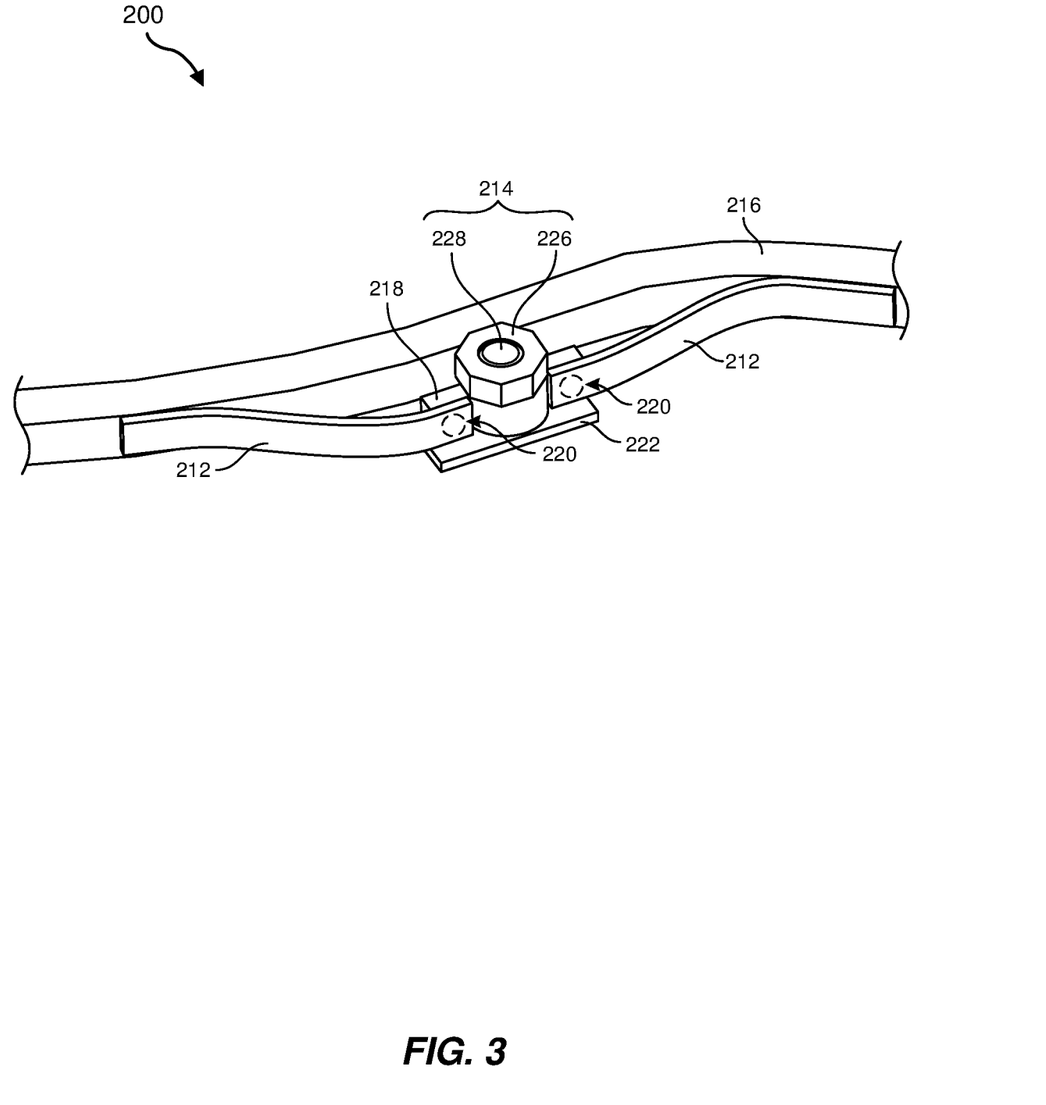
FIG. 3 is a perspective view of the mounting mechanism of FIG. 2.

FIG. 2 is a side cross-sectional view of a mounting mechanism 200 for an optical assembly, according to at least one embodiment of the present disclosure. FIG. 3 is a perspective view of the mounting mechanism 200 of FIG. 2. As shown in FIGS. 2 and 3, the mounting mechanism 200 may include one or more flexures 212 secured to a flexure support 218, such as via one or more respective spot welds 220 and/or adhesive at end portions of the flexures 212. An opposite end portion of the flexures 212 may be secured to a waveguide and/or waveguide holder 216 (shown in FIG. 3). For example, a first flexure 212 may be secured to a first side of the flexure support 218 and a second flexure 212 may be secured to a second, opposite side of the flexure support 218. Alternatively, the flexures 212 and the flexure support 218 may be parts of a single, unitary component. In additional embodiments, only a single flexure 212 may be used in the mounting mechanism 200 (e.g., as in the detachable couplings 110 on the left and right of the optical assembly 100 illustrated in FIG. 1).

Still referring to FIGS. 2 and 3, a detachable coupling 214 may include a base 222 that may be mounted to an underlying frame 204, such as via an adhesive 224, weld, and/or fastener (e.g., a screw, a bolt, a nut, etc.). The detachable coupling 214 may also include a removable retainer 226 (e.g., a nut) engaged with a post 228 (e.g., a screw) of the base 222. The flexure support 218 may be detachably coupled to the frame 204 by positioning the flexure support 218 over the post 228 and engaging the retainer 226 with the post 228 over the flexure support 218. If a waveguide coupled to the flexures 212 is to be removed from the frame 204, the retainer 226 may be removed and the flexure support 218, along with the waveguide, may be lifted off the post 228.

As illustrated in FIG. 2, the post 228 may include a tapered base portion 230 and the flexure support 218 may include a complementary tapered hole 232. In some embodiments, an angle of the tapered base portion 230 and of the tapered hole 232 from perpendicular (e.g., from a longitudinal axis of the post 228) may be between about 5° and about 20°, such as about 10°. This tapered configuration may facilitate proper positioning of the flexure support 218 over the post 228 and may facilitate removal of the flexure support 218 (and, consequently, a corresponding waveguide coupled to the flexures 212) as needed after removing the retainer 226. For example, the tapered configuration may reduce a risk of the flexure support 218 binding to the post 228 or becoming misaligned with the post 228, which would make it difficult to remove the flexure support 218 from the post 228 without causing damage. In addition, the tapered configuration may allow the waveguide to be locked in place during potential shock and transverse loads. A non-tapered shape might result in clearance gaps, which could allow the waveguide to move in the case of shock and transverse loads after mounting.

In some examples, relative terms such as "about," "substantially," "approximately," and the like, in reference to a given parameter, property, or condition, may refer to a degree that one skilled in the art would understand that the given parameter, property, or condition is met with a small degree of variance, such as within acceptable manufacturing tolerances. For example, a parameter that is substantially met may be at least about 90% met, at least about 95% met, at least about 99% met, or fully met.

The retainer 226, post 228, and flexure support 218 may be or include any material that is suitable for their intended purposes. For example, the retainer 226, post 228, and flexure support 218 may be or include a metal and/or a plastic material. In one example, the retainer 226, post 228, and flexure support 218 may include a titanium material. The post 228 and flexure support 218 may be formed by metal injection molding ("MIM"), machining, plastic injection molding, and/or forging, etc. In some embodiments, the post 228 may have a diameter of less than about 5 mm, such as about 2 mm or about 1 mm. By way of example, the mounting mechanism 200, not including the flexures 212 and frame 204, may have an overall smallest width (e.g., into the paper from the view of FIG. 2) of less than about 5 mm, such as about 3 mm, about 2 mm, about 1.75 mm, about 1.5 mm, or about 1 mm. This small size may facilitate fitting the mounting mechanism 200 in the frame 204 even when the frame 204 may have a narrow profile.

Figure 4:
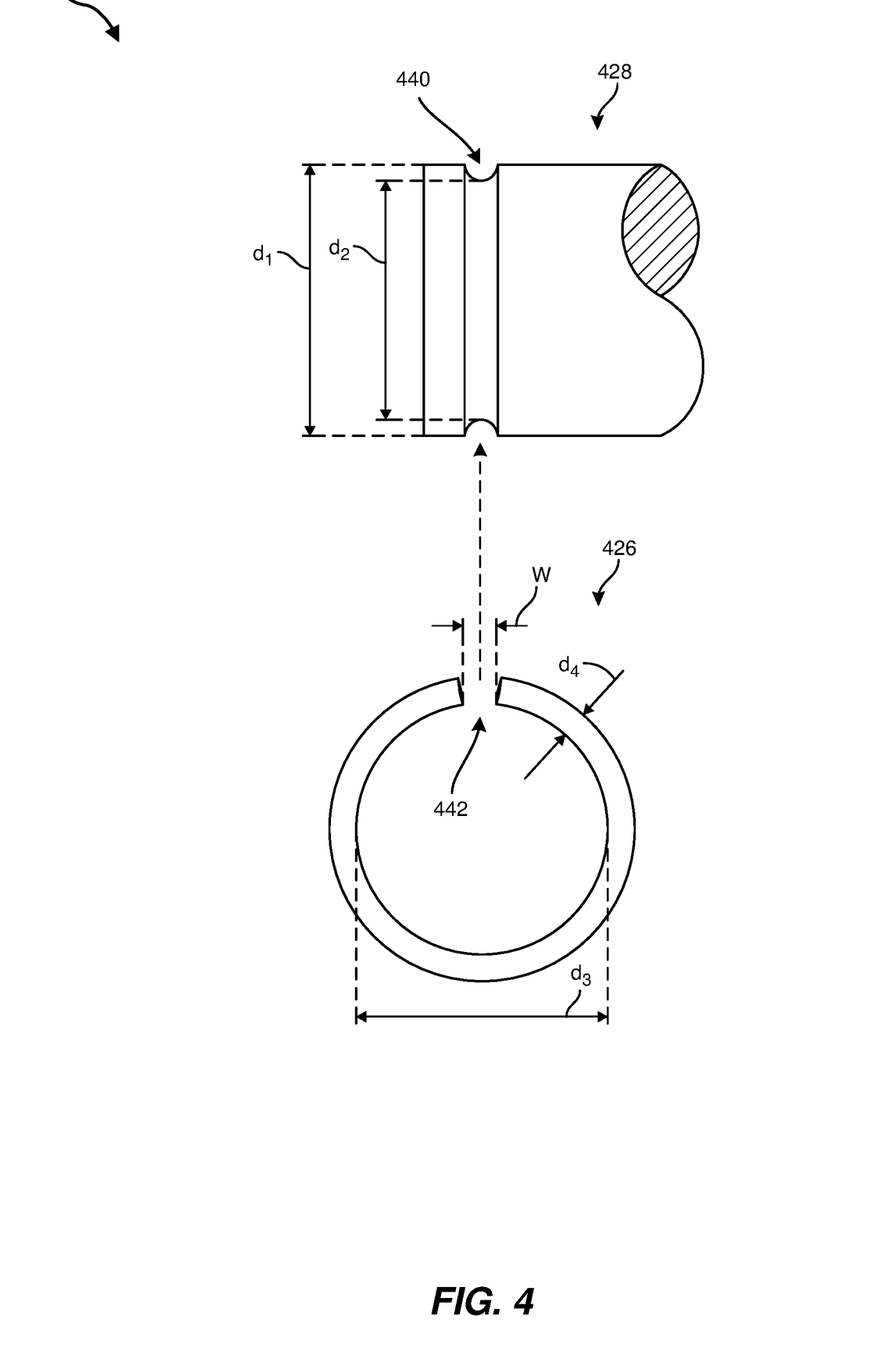
FIG. 4 illustrates a detachable coupling of an optical assembly mounting mechanism, according to at least one additional embodiment of the present disclosure.

FIG. 4 illustrates a detachable coupling 400 of an optical assembly mounting mechanism, according to at least one additional embodiment of the present disclosure. In some embodiments, the detachable coupling 400 may include a post 428 and a split ring 426. The post 428 may include a groove 440 shaped and sized for retaining the split ring 426. In comparison to the embodiments shown in FIGS. 2 and 3, the post 428 may be positioned in place of the post 228 (e.g., tapered screw) and the split ring 428 in place of the retainer 426. To secure a waveguide to a frame, a flexure support may be positioned over the post 428 and the split ring 426 may be positioned over the flexure support and around the post 428 to be retained by the groove 440 of the post. If desired, the waveguide may be removed from the frame by decoupling the split ring 426 from the post 428 and sliding the flexure support off the post 428.

The split ring 426 may be configured for flexing outward to fit around the post 428 and rebounding inward within the groove 440. For example, the split ring 426 may include a split 442, which may have a width W. The split ring 426 may be formed of a material that can be expanded to fit around an outer diameter $d_1$ of the post 428 and that can elastically rebound to fit within the groove 440 having a groove diameter $d_2$. When unflexed, the split ring 426 may have an inner diameter $d_3$ that is less than the outer diameter $d_1$ of the post 428. In some examples, the inner diameter $d_3$ of the split ring 426 may be approximately the same as the groove diameter $d_2$. A thickness $d_4$ of the split ring 426 may be selected to enable elastic deformation (e.g., expansion) of the split ring 426 to position the split ring 426 on the post 428 and/or to remove the split ring 426 from the post 428. The split ring 426 may be formed of a polymer material and/or a metal material.

In additional examples, the split ring 426 may include one or more features to facilitate placement on the post 428 within the groove 440 and/or removal from the post 428. For example, the split ring 426 may include a recess for insertion of a removal tool, one or more extensions for grasping the split ring 426, or the like.

In some embodiments, the split ring 426 may have a narrower profile than a corresponding nut. Accordingly, the split ring 426 and post 428 may enable the detachable coupling 400 to be smaller than a similar coupling that includes a screw and nut. Nonetheless, in some embodiments of the present disclosure, a screw and nut may be used, such as to reduce a cost and/or to facilitate interacting with the couplings, such as to place and/or remove a waveguide.

In FIG. 4, the post 428 is illustrated as having a substantially straight cylindrical outer profile. However, in additional embodiments, a base portion of the post 428 may be tapered, as explained above with reference to the post 228 of FIG. 2.

Figure 5:
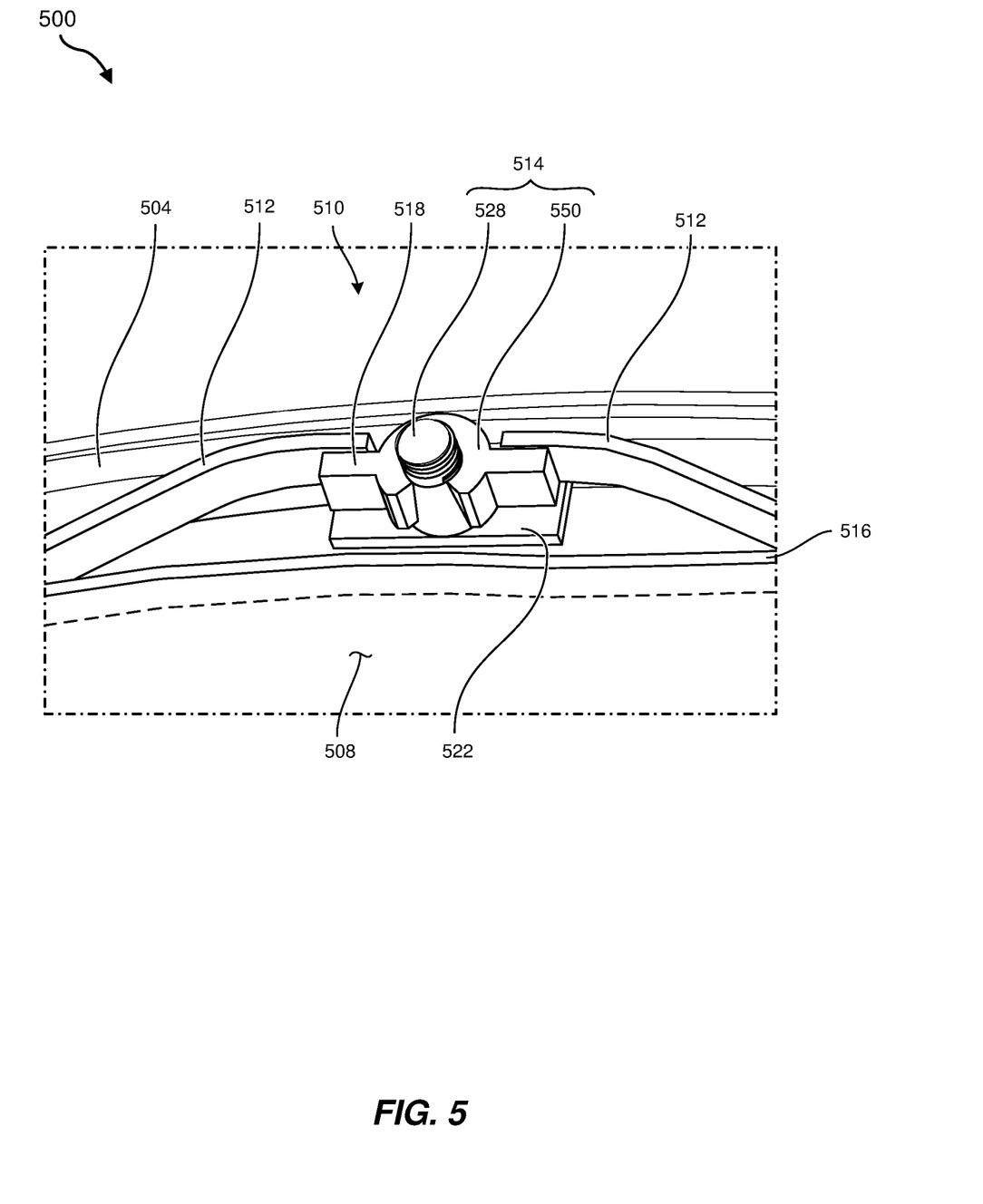
FIG. 5 is a perspective view of a mounting mechanism for an optical assembly, according to at least one further embodiment of the present disclosure.
Figure 6:
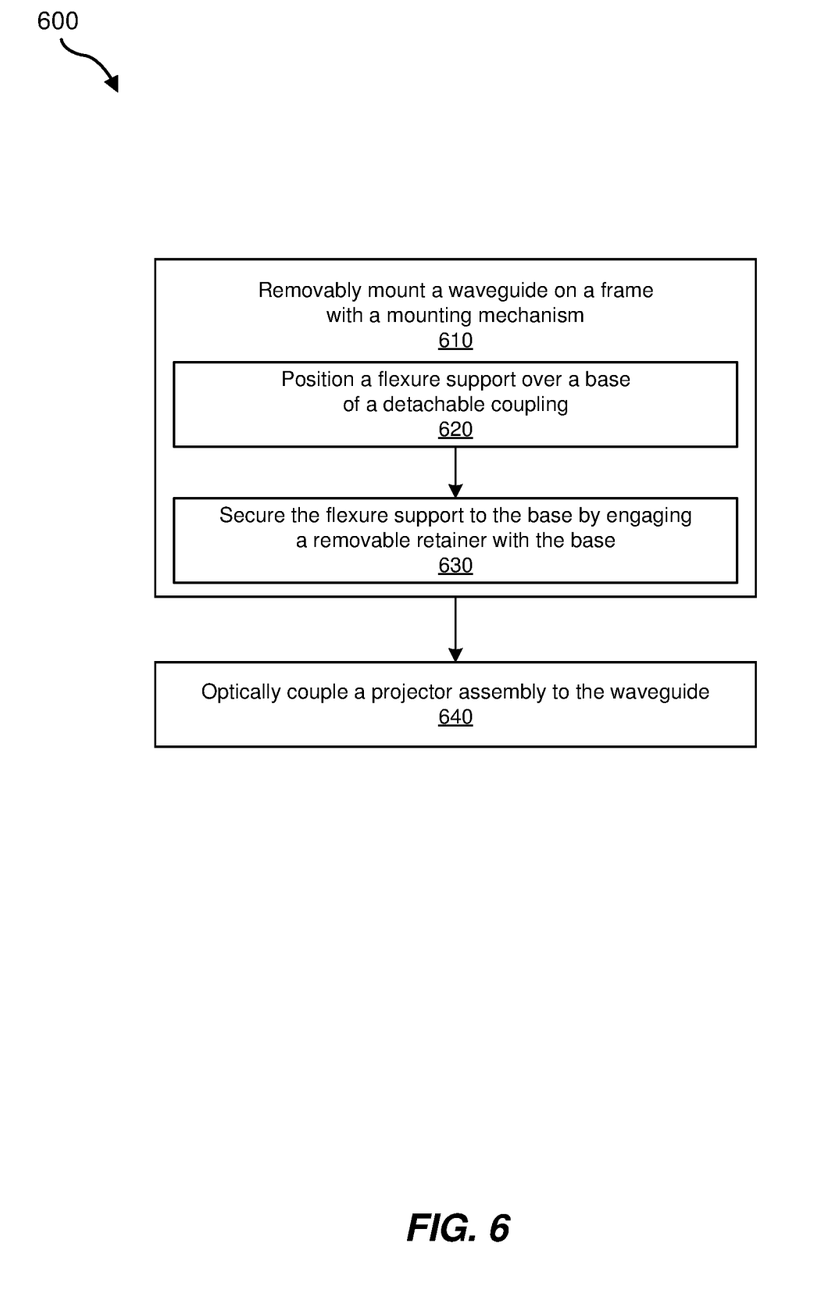
FIG. 6 is a flow diagram illustrating a method of assembling an optical assembly, according to at least one embodiment of the present disclosure.

FIG. 5 is a perspective view of a mounting mechanism 500 for an optical assembly, according to at least one further embodiment of the present disclosure. The mounting mechanism 500 may include a flexure assembly 510 that includes one or more flexures 512, a flexure support 518, and a detachable coupling 514. The flexures 512 may be secured to and extend between the detachable coupling 514 and a waveguide 508 or a waveguide holder 516. The detachable coupling 514 may include a post 528 that may be secured to an underlying frame 504 (e.g., an augmented-reality glasses frame), such as via an adhesive securing a base 522 of the post 528 to the frame 504. The detachable coupling 514 may also include a C-shaped clamp 550 that may be positioned over the post 528. As in the embodiment shown in FIG. 2, a base portion of the post 528 may be tapered and the C-shaped clamp 550 may include a complementary taper for fitting over the post 528. In some examples, as shown in FIG. 5, the C-shaped clamp 550 may be a unitary, integral part of the flexure support 518.

A removable retainer (e.g., a nut, a split ring, etc.) complementary to the post 528 is omitted from FIG. 5 to provide a better view of the underlying portions of the mounting mechanism 500.

In some embodiments, the post 528 may also include threads (as shown in FIG. 5) for positioning a nut over the C-shaped clamp 550 to hold the C-shaped clamp 550 in place relative to the post 528, as described above with reference to FIGS. 2 and 3. In other embodiments, the post 528 may include a groove for receiving a split ring, as described above with reference to FIG. 4. In additional embodiments, the C-shaped clamp 550 may include a protrusion and the post 528 may include a groove for receiving the protrusion. The C-shaped clamp 550 may be held in place when the protrusion snaps into the groove, and the C-shaped clamp 550 may be removed from the post 528 as needed by flexing the C-shaped clamp 550 outward to disengage the protrusion from the groove. In some examples, multiple different coupling mechanisms may be used, such as both a nut and a protrusion with a complementary groove.

The C-shaped clamp 550 may reduce a size of the detachable coupling 514, compared to a flexure support that fully surrounds a post. For example, the open part of the C-shaped clamp 550 may reduce a smallest width of the detachable coupling 514. The reduced size of the detachable coupling 514 may facilitate fitting the detachable coupling 514 into a small space, such as into a glasses frame with a small profile.

FIG. 6 is a flow diagram illustrating a method 600 of assembling an optical assembly, according to at least one embodiment of the present disclosure. At operation 610, a waveguide may be removably mounted on a frame with a mounting mechanism. Operation 610 may be performed in a variety of ways. For example, operation 610 may include operations 620 and 630.

At operation 620, a flexure support may be positioned over a base of a detachable coupling that is coupled to the frame, such as over a post or a screw of the detachable coupling. The flexible support may be coupled to a peripheral edge of the waveguide with at least one flexure, such as via a waveguide holder extending along the peripheral edge of the waveguide.

At operation 630, the flexure support may be secured to the base, consequently mounting the waveguide to the frame, by engaging a removable retainer with the base. For example, a split ring or a nut may be engaged with a complementary groove or threads of a post of the base.

At operation 640, a projector assembly may be optically coupled to the waveguide, such that an image generated by the projector assembly may be redirected through the waveguide to a position in front of a user's eye when the head-mounted display is worn by the user. Operation 640 may be performed in a variety of ways. For example, one or more subprojectors of the projector assembly may be optically aligned with one or more corresponding input gratings of the waveguide. The optical coupling of the projector assembly to the waveguide may be performed after mounting the waveguide to the frame in operation 610, as illustrated in the flow chart of FIG. 6. In additional embodiments, the projector assembly may be pre-aligned and pre-assembled to the waveguide prior to mounting the waveguide to the frame.

Accordingly, the present disclosure includes optical assemblies, mounting mechanisms for optical assemblies, artificial-reality headsets, and methods that may facilitate attachment and removal of the optical assemblies, such as for repair and/or replacement.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 700 in FIG. 7) or that visually immerses a user in an artificial reality (such as, e.g., virtual-reality system 800 in FIG. 8). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 7:
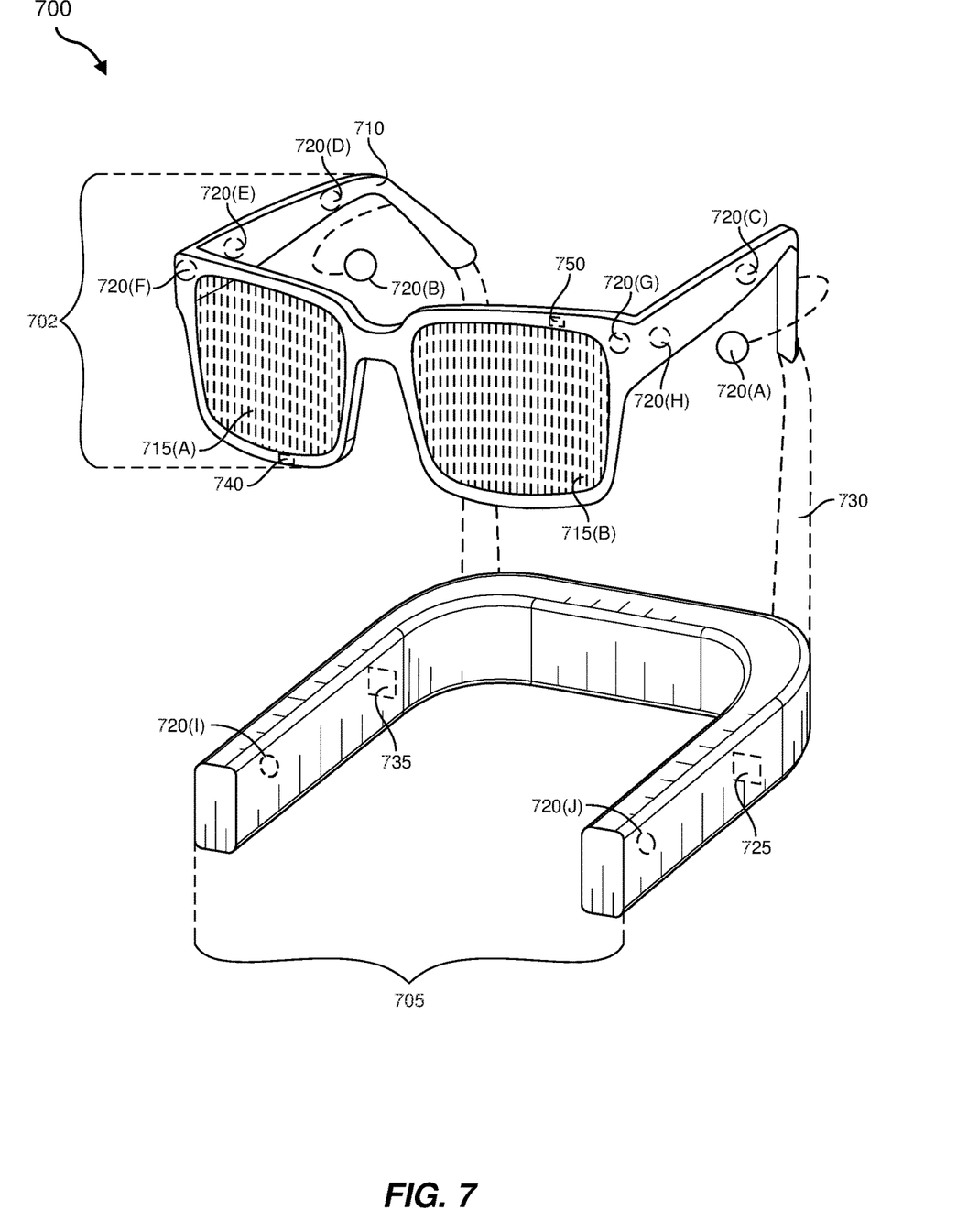
FIG. 7 is an illustration of example augmented-reality glasses that may be used in connection with embodiments of this disclosure.

Turning to FIG. 7, the augmented-reality system 700 may include an eyewear device 702 with a frame 710 configured to hold a left display device 715(A) and a right display device 715(B) in front of a user's eyes. The display devices 715(A) and 715(B) may act together or independently to present an image or series of images to a user. While the augmented-reality system 700 includes two displays, embodiments of this disclosure may be implemented in augmented-reality systems with a single NED or more than two NEDs.

In some embodiments, the augmented-reality system 700 may include one or more sensors, such as sensor 740. The sensor 740 may generate measurement signals in response to motion of the augmented-reality system 700 and may be located on substantially any portion of the frame 710. The sensor 740 may represent one or more of a variety of different sensing mechanisms, such as a position sensor, an inertial measurement unit (IMU), a depth camera assembly, a structured light emitter and/or detector, or any combination thereof. In some embodiments, the augmented-reality system 700 may or may not include the sensor 740 or may include more than one sensor. In embodiments in which the sensor 740 includes an IMU, the IMU may generate calibration data based on measurement signals from the sensor 740. Examples of the sensor 740 may include, without limitation, accelerometers, gyroscopes, magnetometers, other suitable types of sensors that detect motion, sensors used for error correction of the IMU, or some combination thereof.

In some examples, the augmented-reality system 700 may also include a microphone array with a plurality of acoustic transducers 720(A)-720(J), referred to collectively as acoustic transducers 720. The acoustic transducers 720 may represent transducers that detect air pressure variations induced by sound waves. Each acoustic transducer 720 may be configured to detect sound and convert the detected sound into an electronic format (e.g., an analog or digital format). The microphone array in FIG. 7 may include, for example, ten acoustic transducers: 720(A) and 720(B), which may be designed to be placed inside a corresponding ear of the user, acoustic transducers 720(C), 720(D), 720(E), 720(F), 720(G), and 720(H), which may be positioned at various locations on the frame 710, and/or acoustic transducers 720(I) and 720(J), which may be positioned on a corresponding neckband 705.

In some embodiments, one or more of the acoustic transducers 720(A)-(J) may be used as output transducers (e.g., speakers). For example, the acoustic transducers 720(A) and/or 720(B) may be earbuds or any other suitable type of headphone or speaker.

The configuration of the acoustic transducers 720 of the microphone array may vary. While the augmented-reality system 700 is shown in FIG. 7 as having ten acoustic transducers 720, the number of acoustic transducers 720 may be greater or less than ten. In some embodiments, using higher numbers of acoustic transducers 720 may increase the amount of audio information collected and/or the sensitivity and accuracy of the audio information. In contrast, using a lower number of acoustic transducers 720 may decrease the computing power required by an associated controller 750 to process the collected audio information. In addition, the position of each acoustic transducer 720 of the microphone array may vary. For example, the position of an acoustic transducer 720 may include a defined position on the user, a defined coordinate on the frame 710, an orientation associated with each acoustic transducer 720, or some combination thereof.

The acoustic transducers 720(A) and 720(B) may be positioned on different parts of the user's ear, such as behind the pinna, behind the tragus, and/or within the auricle or fossa. Or, there may be additional acoustic transducers 720 on or surrounding the ear in addition to the acoustic transducers 720 inside the ear canal. Having an acoustic transducer 720 positioned next to an ear canal of a user may enable the microphone array to collect information on how sounds arrive at the ear canal. By positioning at least two of the acoustic transducers 720 on either side of a user's head (e.g., as binaural microphones), the augmented-reality device 700 may simulate binaural hearing and capture a 3D stereo sound field around about a user's head. In some embodiments, the acoustic transducers 720(A) and 720(B) may be connected to the augmented-reality system 700 via a wired connection 730, and in other embodiments the acoustic transducers 720(A) and 720(B) may be connected to the augmented-reality system 700 via a wireless connection (e.g., a BLUETOOTH connection). In still other embodiments, the acoustic transducers 720(A) and 720(B) may not be used at all in conjunction with the augmented-reality system 700.

The acoustic transducers 720 on the frame 710 may be positioned in a variety of different ways, including along the length of the temples, across the bridge, above or below display devices 715(A) and 715(B), or some combination thereof. The acoustic transducers 720 may also be oriented such that the microphone array is able to detect sounds in a wide range of directions surrounding the user wearing the augmented-reality system 700. In some embodiments, an optimization process may be performed during manufacturing of the augmented-reality system 700 to determine relative positioning of each acoustic transducer 720 in the microphone array.

In some examples, the augmented-reality system 700 may include or be connected to an external device (e.g., a paired device), such as the neckband 705. The neckband 705 generally represents any type or form of paired device. Thus, the following discussion of the neckband 705 may also apply to various other paired devices, such as charging cases, smart watches, smart phones, wrist bands, other wearable devices, hand-held controllers, tablet computers, laptop computers, other external compute devices, etc.

As shown, the neckband 705 may be coupled to the eyewear device 702 via one or more connectors. The connectors may be wired or wireless and may include electrical and/or non-electrical (e.g., structural) components. In some cases, the eyewear device 702 and the neckband 705 may operate independently without any wired or wireless connection between them. While FIG. 7 illustrates the components of the eyewear device 702 and neckband 705 in example locations on the eyewear device 702 and neckband 705, the components may be located elsewhere and/or distributed differently on the eyewear device 702 and/or neckband 705. In some embodiments, the components of the eyewear device 702 and neckband 705 may be located on one or more additional peripheral devices paired with the eyewear device 702, neckband 705, or some combination thereof.

Pairing external devices, such as the neckband 705, with augmented-reality eyewear devices may enable the eyewear devices to achieve the form factor of a pair of glasses while still providing sufficient battery and computation power for expanded capabilities. Some or all of the battery power, computational resources, and/or additional features of the augmented-reality system 700 may be provided by a paired device or shared between a paired device and an eyewear device, thus reducing the weight, heat profile, and form factor of the eyewear device overall while still retaining desired functionality. For example, the neckband 705 may allow components that would otherwise be included on an eyewear device to be included in the neckband 705 since users may tolerate a heavier weight load on their shoulders than they would tolerate on their heads. The neckband 705 may also have a larger surface area over which to diffuse and disperse heat to the ambient environment. Thus, the neckband 705 may allow for greater battery and computation capacity than might otherwise have been possible on a standalone eyewear device. Since weight carried in the neckband 705 may be less invasive to a user than weight carried in the eyewear device 702, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

The neckband 705 may be communicatively coupled with the eyewear device 702 and/or to other devices. These other devices may provide certain functions (e.g., tracking, localizing, depth mapping, processing, storage, etc.) to the augmented-reality system 700. In the embodiment of FIG. 7, the neckband 705 may include two acoustic transducers (e.g., 720(I) and 720(J)) that are part of the microphone array (or potentially form their own microphone subarray). The neckband 705 may also include a controller 725 and a power source 735.

The acoustic transducers 720(I) and 720(J) of the neckband 705 may be configured to detect sound and convert the detected sound into an electronic format (analog or digital). In the embodiment of FIG. 7, the acoustic transducers 720(I) and 720(J) may be positioned on the neckband 705, thereby increasing the distance between the neckband acoustic transducers 720(I) and 720(J) and other acoustic transducers 720 positioned on the eyewear device 702. In some cases, increasing the distance between the acoustic transducers 720 of the microphone array may improve the accuracy of beamforming performed via the microphone array. For example, if a sound is detected by the acoustic transducers 720(C) and 720(D) and the distance between the acoustic transducers 720(C) and 720(D) is greater than, e.g., the distance between the acoustic transducers 720(D) and 720(E), the determined source location of the detected sound may be more accurate than if the sound had been detected by the acoustic transducers 720(D) and 720(E).

The controller 725 of the neckband 705 may process information generated by the sensors on the neckband 705 and/or augmented-reality system 700. For example, the controller 725 may process information from the microphone array that describes sounds detected by the microphone array. For each detected sound, the controller 725 may perform a direction-of-arrival (DOA) estimation to estimate a direction from which the detected sound arrived at the microphone array. As the microphone array detects sounds, the controller 725 may populate an audio data set with the information. In embodiments in which the augmented-reality system 700 includes an inertial measurement unit, the controller 725 may compute all inertial and spatial calculations from the IMU located on the eyewear device 702. A connector may convey information between the augmented-reality system 700 and the neckband 705 and between the augmented-reality system 700 and the controller 725. The information may be in the form of optical data, electrical data, wireless data, or any other transmittable data form. Moving the processing of information generated by the augmented-reality system 700 to the neckband 705 may reduce weight and heat in the eyewear device 702, making it more comfortable to the user.

The power source 735 in the neckband 705 may provide power to the eyewear device 702 and/or to the neckband 705. The power source 735 may include, without limitation, lithium ion batteries, lithium-polymer batteries, primary lithium batteries, alkaline batteries, or any other form of power storage. In some cases, the power source 735 may be a wired power source. Including the power source 735 on the neckband 705 instead of on the eyewear device 702 may help better distribute the weight and heat generated by the power source 735.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 800 in FIG. 8, that mostly or completely covers a user's field of view. The virtual-reality system 800 may include a front rigid body 802 and a band 804 shaped to fit around a user's head. The virtual-reality system 800 may also include output audio transducers 806(A) and 806(B). Furthermore, while not shown in FIG. 8, the front rigid body 802 may include one or more electronic elements, including one or more electronic displays, one or more inertial measurement units (IMUS), one or more tracking emitters or detectors, and/or any other suitable device or system for creating an artificial-reality experience.

Figure 8:
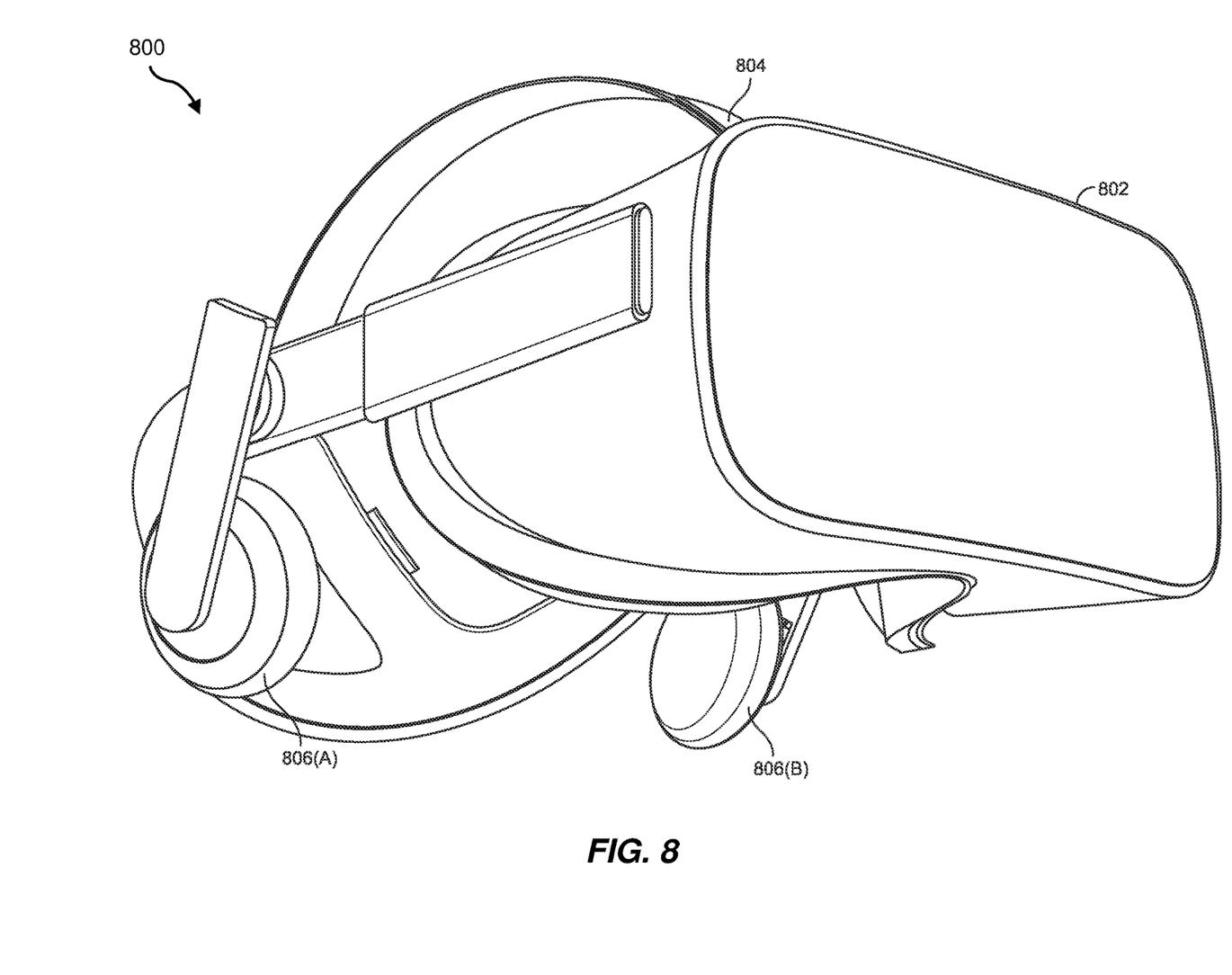
FIG. 8 is an illustration of an example virtual-reality headset that may be used in connection with embodiments of this disclosure.

Artificial-reality systems may include a variety of types of visual feedback mechanisms. For example, display devices in the augmented-reality system 700 and/or the virtual-reality system 800 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in the augmented-reality system 700 and/or the virtual-reality system 800 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, the augmented-reality system 700 and/or the virtual-reality system 800 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

The following example embodiments are also included in the present disclosure.

Example 1: An optical assembly, which may include: a projector assembly for generating an image; a waveguide for transmitting the image from the projector assembly to a location in front of a user's eye; and a mounting mechanism that removably couples the waveguide to an underlying frame, the mounting mechanism including: a detachable coupling including a base secured to the frame and a removable retainer engaged with the base; at least one flexure secured to a peripheral edge of the waveguide; and at least one flexure support coupled to the at least one flexure, the at least one flexure support removably secured to the detachable coupling by the removable retainer.

Example 2: The optical assembly of Example 1, wherein the base of the detachable coupling includes at least one of a post or a screw and the removable retainer includes at least one of a split ring or a nut.

Example 3: The optical assembly of Example 2, wherein a base portion of the post or screw is tapered.

Example 4: The optical assembly of Example 3, wherein the flexure support includes a tapered inner surface complementary to the tapered base portion of the post or screw.

Example 5: The optical assembly of any of Examples 1 through 4, wherein the at least one flexure is secured to the peripheral edge of the waveguide via a waveguide holder.

Example 6: The optical assembly of any of Examples 1 through 5, wherein a width of the detachable coupling is less than about 5 mm.

Example 7: The optical assembly of any of Examples 1 through 6, wherein the at least one flexure includes a first flexure and a second flexure, wherein the first flexure is secured to a first side of the flexure support and the second flexure is secured to a second, opposite side of the flexure support.

Example 8: The optical assembly of Example 7, wherein the first flexure and the second flexure are secured to the flexure support via respective spot welds.

Example 9: The optical assembly of any of Examples 1 through 8, wherein the base is secured to the frame with at least one of: an adhesive, a weld, or a fastener.

Example 10: The optical assembly of any of Examples 1 through 9, wherein the flexure support includes a C-shaped clamp shaped and sized to engage with the base of the detachable coupling.

Example 11: The optical assembly of any of Examples 1 through 10, wherein the at least one flexure includes at least one of: a metal material; a plastic material; or a fiber-matrix composite material.

Example 12: A head-mounted display, which may include: an optical assembly, including: a projector assembly including at least one subprojector; a waveguide configured for redirecting light from the at least one subprojector to a position in front of a user's eye; and flexure assemblies coupled to a peripheral edge of the waveguide; and a frame configured for mounting the optical assembly on a head of a user with at least a portion of the waveguide in front of the user's eye, wherein the waveguide is removably coupled to the frame with the flexure assemblies via detachable couplings.

Example 13: The head-mounted display of Example 12, wherein each of the detachable couplings includes: a base secured to the frame; and a removable retainer removably coupled to the base.

Example 14: The head-mounted display of Example 13, wherein the flexure assembly is engaged with the base and held in place with the removable retainer.

Example 15: The head-mounted display of Example 13 or Example 14, wherein the base includes a post or a screw and the removable retainer includes a split ring or a nut.

Example 16: The head-mounted display of any of Examples 12 through 15, wherein the flexure assemblies are coupled to the peripheral edge of the waveguide via a waveguide holder positioned along the peripheral edge of the waveguide.

Example 17: The head-mounted display of any of Examples 12 through 16, wherein each flexure assembly includes at least one flexure extending from a flexure support to the peripheral edge of the waveguide.

Example 18: The head-mounted display of Example 17, wherein each flexure assembly includes two flexures.

Example 19: A method of assembling an optical assembly, which may include: removably mounting a waveguide on a frame with a mounting mechanism, including: positioning a flexure support over a base of a detachable coupling, the flexible support coupled to a peripheral edge of the waveguide with at least one flexure; and securing the flexure support to the base of the detachable coupling by engaging a removable retainer with the base; and optically coupling a projector assembly for generating an image to the waveguide such that the waveguide transmits the image from the projector assembly to a location in front of a user's eye.

Example 20: The method of Example 19, wherein engaging the removable retainer with the base includes engaging a nut with a screw of the base.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. An optical assembly, comprising:
   a projector assembly for generating an image;
   a waveguide for transmitting the image from the projector assembly to a location in front of a user's eye; and
   a mounting mechanism that removably couples the waveguide to an underlying frame, the mounting mechanism comprising:
      a detachable coupling including a base secured to the frame and a removable retainer engaged with the base;
      at least one flexure including a flexible strip of material secured to a peripheral edge of the waveguide; and
      at least one flexure support coupled to the at least one flexure, the at least one flexure support removably secured to the detachable coupling by the removable retainer.

2. The optical assembly of claim 1, wherein the base of the detachable coupling comprises at least one of a post or a screw and the removable retainer comprises at least one of a split ring or a nut.

3. The optical assembly of claim 2, wherein a base portion of the post or screw is tapered.

4. The optical assembly of claim 3, wherein the flexure support includes a tapered inner surface complementary to the tapered base portion of the post or screw.

5. The optical assembly of claim 1, wherein the at least one flexure is secured to the peripheral edge of the waveguide via a waveguide holder.

6. The optical assembly of claim 1, wherein a width of the detachable coupling is less than about 5 mm.

7. The optical assembly of claim 1, wherein the at least one flexure comprises a first flexure and a second flexure, wherein the first flexure is secured to a first side of the flexure support and the second flexure is secured to a second, opposite side of the flexure support.

8. The optical assembly of claim 7, wherein the first flexure and the second flexure are secured to the flexure support via respective spot welds.

9. The optical assembly of claim 1, wherein the base is secured to the frame with at least one of: an adhesive, a weld, or a fastener.

10. The optical assembly of claim 1, wherein the flexure support comprises a C-shaped clamp shaped and sized to engage with the base of the detachable coupling.

11. The optical assembly of claim 1, wherein the at least one flexure comprises at least one of: a metal material; a plastic material; or a fiber-matrix composite material.

12. A head-mounted display, comprising:
   an optical assembly, comprising:
      a projector assembly including at least one subprojector;
      a waveguide configured for redirecting light from the at least one subprojector to a position in front of a user's eye; and
      flexure assemblies comprising flexures including flexible strips of material coupled to a peripheral edge of the waveguide; and
   a frame configured for mounting the optical assembly on a head of a user with at least a portion of the waveguide in front of the user's eye,
   wherein the waveguide is removably coupled to the frame with the flexure assemblies via detachable couplings.

13. The head-mounted display of claim 12, wherein each of the detachable couplings comprises:
   a base secured to the frame; and
   a removable retainer removably coupled to the base.

14. The head-mounted display of claim 13, wherein the flexure assembly is engaged with the base and held in place with the removable retainer.

15. The head-mounted display of claim 13, wherein the base comprises a post or a screw and the removable retainer comprises a split ring or a nut.

16. The head-mounted display of claim 12, wherein the flexure assemblies are coupled to the peripheral edge of the waveguide via a waveguide holder positioned along the peripheral edge of the waveguide.

17. The head-mounted display of claim 12, wherein each flexure assembly comprises at least one flexure extending from a flexure support to the peripheral edge of the waveguide.

18. The head-mounted display of claim 17, wherein each flexure assembly comprises two flexures.

19. A method of assembling an optical assembly, comprising:
- removably mounting a waveguide on a frame with a mounting mechanism, comprising:
  - positioning a flexure support over a base of a detachable coupling, the flexure support coupled to a peripheral edge of the waveguide with at least one flexure including a flexible strip of material; and
  - securing the flexure support to the base of the detachable coupling by engaging a removable retainer with the base; and
- optically coupling a projector assembly for generating an image to the waveguide such that the waveguide transmits the image from the projector assembly to a location in front of a user's eye.

20. The method of claim 19, wherein engaging the removable retainer with the base comprises engaging a nut with a screw of the base.

* * * * *